(12) United States Patent
Satoyama et al.

(10) Patent No.: US 12,158,822 B2
(45) Date of Patent: Dec. 3, 2024

(54) INFORMATION PROCESSING SYSTEM AND BACKUP METHOD

(71) Applicant: Hitachi, Ltd., Tokyo (JP)

(72) Inventors: Ai Satoyama, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 42 days.

(21) Appl. No.: 18/182,077

(22) Filed: Mar. 10, 2023

(65) Prior Publication Data

US 2024/0070035 A1  Feb. 29, 2024

(30) Foreign Application Priority Data

Aug. 25, 2022  (JP) ................. 2022-134233

(51) Int. Cl.
  *G06F 11/14*  (2006.01)
(52) U.S. Cl.
  CPC ...... *G06F 11/1469* (2013.01); *G06F 11/1451* (2013.01); *G06F 11/1464* (2013.01)
(58) Field of Classification Search
  CPC .. G06F 11/14; G06F 11/1469; G06F 11/1451; G06F 11/1464
  See application file for complete search history.

(56) References Cited

U.S. PATENT DOCUMENTS

| 10,261,872 B2 * | 4/2019 | Boshev ................. G06F 16/273 |
| 2008/0172572 A1 * | 7/2008 | Beardsley ........... G06F 11/2082 714/E11.098 |
| 2009/0271582 A1 * | 10/2009 | Ninose ................. G06F 11/2069 711/E12.103 |
| 2014/0380087 A1 * | 12/2014 | Jamjoom ............ G06F 11/2028 714/4.11 |
| 2018/0349238 A1 * | 12/2018 | Boshev ................ G06F 11/2023 |
| 2022/0164266 A1 * | 5/2022 | Butucea Panait ..... G06F 16/273 |
| 2022/0237086 A1 * | 7/2022 | Kumar ................ G06F 11/1458 |
| 2022/0377135 A1 * | 11/2022 | Boshev ............... H04L 67/1001 |
| 2022/0391495 A1 * | 12/2022 | Boshev ................. G06F 21/577 |

* cited by examiner

*Primary Examiner* — Kamini B Patel
(74) *Attorney, Agent, or Firm* — Volpe Koenig

(57) ABSTRACT

A primary site includes a volume #1 that stores data, and copies first backup data that is backup data of data corresponding to the volume #1 to a secondary site. In the failover process of handing over the execution of a transaction process from the primary site to the secondary site, a cloud management node restores the volume #1 to a storage system as a volume #2 based on the first backup data copied to the secondary site. The cloud management node manages the first backup data, as second backup data, that is backup data of data corresponding to the volume #2.

5 Claims, 12 Drawing Sheets

| VOLUME ID (411) | SNAPSHOT VOLUME ID (412) | SNAPSHOT ACQUISITION DATE AND TIME (413) | GROUP ID (414) |
|---|---|---|---|
| 1 | S0 | 1/10 8:00 | BuG1 |
|   | S1 | 1/10 9:00 |  |
|   | S2 | 1/10 10:00 |  |
|   | S3 | 1/10 11:00 |  |
|   | S4 | 1/10 12:00 |  |
|   | S5 | 1/10 13:00 |  |
|   |   | ... | ... |

| VOLUME ID (421) | DEVICE ID (422) | BACKUP VOLUME ID (423) | DIFFERENCE ID (424) | ADDRESS INFORMATION (425) | DEVICE ID (426) |
|---|---|---|---|---|---|
| 1 | STORAGE AA | S0 | dS1 | ADDRESS 101 | STORAGE CC |
|   |   |   | dS2 |  |  |
|   |   |   | dS3 |  |  |
|   |   |   | dS4 |  |  |
|   |   |   | dS5 |  |  |
|   |   | ... | ... | ... |  |

| GROUP ID (431) | BACKUP OPERATION CONDITION (432) |
|---|---|
| BuG1 | · EVERY DAY<br>· START AT 8: 00 AND SNAPSHOT ON AN HOURLY BASIS |
|  |  |
| ... | ... |

| PRIMARY ID (441) | PRIMARY VOLUME ID (442) | SECONDARY ID (443) | SECONDARY VOLUME ID (444) |
|---|---|---|---|
| STORAGE AA | 1 | STORAGE BB | 2 |
|  |  |  |  |
|  |  |  |  |
| ... | ... |  |  |

| VOLUME ID (411a) | SNAPSHOT VOLUME ID (412a) | SNAPSHOT ACQUISITION DATE AND TIME (413a) | GROUP ID (414a) |
|---|---|---|---|
| 2 | RS0 | 1/10 13:00 | BuG1 |
|  | RS1 | 1/10 15:00 |  |
|  | RS2 | 1/10 16:00 |  |
|  |  | ... | ... |

| VOLUME ID (421a) | DEVICE ID (422a) | BACKUP VOLUME ID (423a) | DIFFERENCE ID (424a) | ADDRESS INFORMATION (425a) | DEVICE ID (426a) |
|---|---|---|---|---|---|
| 1 | STORAGE AA | S0 | - | - | STORAGE CC |
|  |  |  | dS1 | ADDRESS 101 |  |
|  |  |  | dS2 |  |  |
|  |  |  | dS3 |  |  |
|  |  |  | dS4 |  |  |
|  |  |  | dS5 |  |  |
| 2 | STORAGE BB |  | dRS1 | ... |  |
|  |  |  | dRS2 |  |  |

| VOLUME ID | SNAPSHOT VOLUME ID | SNAPSHOT ACQUISITION DATE AND TIME | GROUP ID |
|---|---|---|---|
| 1 | S0 | 1/10  8:00 | BuG1 |
|   | S1 | 1/10  9:00 |   |
|   | S2 | 1/10  10:00 |   |
|   | S3 | 1/10  11:00 |   |
|   | S4 | 1/10  12:00 |   |
|   | S5 | 1/10  13:00 |   |
|   | S6 | 1/10  15:00 |   |
|   | S7 | 1/10  16:00 |   |
|   |   | ... | ... |

| VOLUME ID | DEVICE ID | BACKUP VOLUME ID | DIFFERENCE ID | ADDRESS INFORMATION | DEVICE ID |
|---|---|---|---|---|---|
| 1 | STORAGE AA | S0 | - | - | STORAGE CC |
|   |   |   | dS1 | ADDRESS 101 |   |
|   |   |   | dS2 |   |   |
|   |   |   | dS3 |   |   |
|   |   |   | dS4 |   |   |
|   |   |   | dS5 |   |   |
|   |   |   | dS6 | ... |   |
|   |   |   | dS7 |   |   |
|   |   |   | dS8 |   |   |

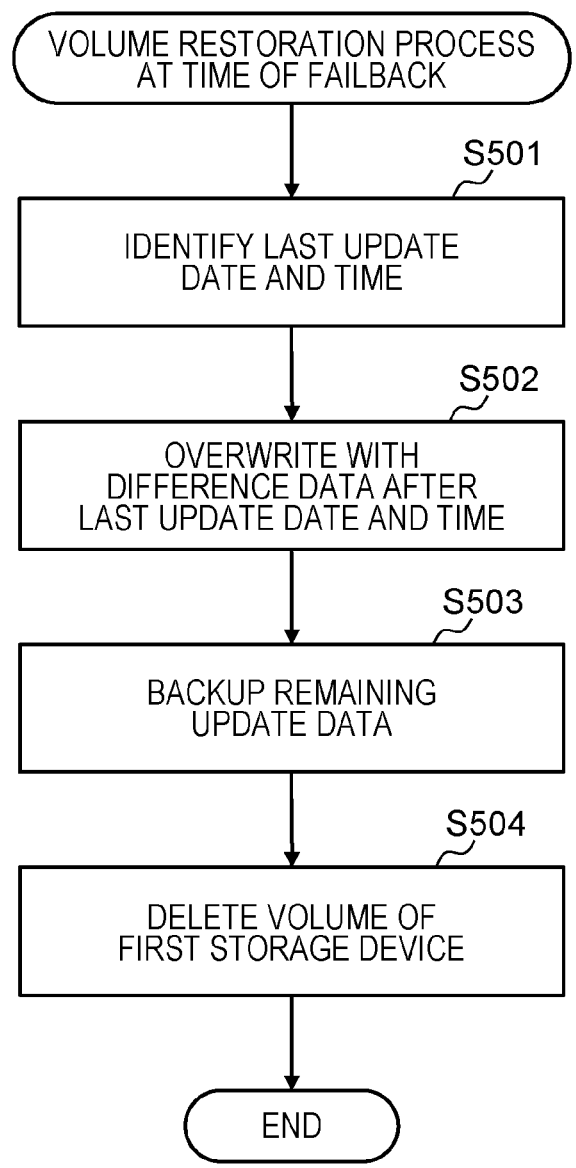

INFORMATION PROCESSING SYSTEM AND BACKUP METHOD

BACKGROUND OF THE INVENTION

1. Field of the Invention

The present disclosure relates to an information processing system and a backup method.

2. Description of the Related Art

In recent years, in a storage system, an operation in a hybrid cloud environment has progressed, and an operation in which data of an on-premises storage is backed up in a cloud storage, an operation in which a disaster recovery (DR) environment is constructed in a cloud, and the like are performed.

US 2009/0271582 A discloses a disaster recovery technology in which data is multiplexed and held at a secondary site which is a remote site in preparation for a data loss at a primary site when a large-scale disaster such as an earthquake or a fire occurs. In this technology, a snapshot volume of a volume stored in on-premises storage is acquired over a plurality of generations, and the snapshot volume is backed up to cloud storage.

SUMMARY OF THE INVENTION

In the disaster recovery technology as described above, in a case where failover is performed in which a transaction is handed over from an on-premises storage as a primary site to a cloud storage as a secondary site, a volume is restored to the cloud storage using data backed up in the cloud storage. At this time, in the cloud storage, the operation of the backup of the data performed before the failover is also resumed. However, since the volume restored to the cloud storage is recognized as a new volume different from the original volume in the on-premises storage, the backup for the restored volume is managed and performed separately from the backup of the original volume. For this reason, there is a problem that information such as parameters set for the backup operation of the original volume is not handed over to the restored volume.

Furthermore, since the backup of the restored volume is managed separately from the backup of the original volume, a process of backing up the full volume that has been backed up again occurs in the backup process in the on-premises storage, and there is a problem that an extra cost is required.

For example, since the restored volume is restored by using the backed up data, the data is backed up even although the restored volume itself is not backed up. Regardless this fact, the full volume copy of the volume restored is executed by the new backup process. In the full volume copy, capacity of data to be copied is large and it takes a long time, so that unnecessary cost is required.

An object of the present disclosure is to provide an information processing system and a backup method capable of reducing costs related to backup.

An information processing system according to an aspect of the present disclosure includes a first storage system, a second storage system, and a management node, wherein the first storage system includes a first volume for storing data and copies first backup data to the second storage system, the first backup data being backup data of data corresponding to the first volume, and, in a failover process of handing over execution of a transaction process from the first storage system to the second storage system, the management node restores the first volume, as a second volume, to the second storage system based on the first backup data copied to the second storage system, and manages the first backup data as second backup data that is backup data of data corresponding to the second volume.

According to the present invention, it is possible to reduce the cost related to backup.

BRIEF DESCRIPTION OF THE DRAWINGS

FIG. 4 is a diagram illustrating an example of volume management information;

FIG. 5 is a diagram illustrating an example of backup volume management information;

FIG. 6 is a diagram illustrating an example of backup operation information;

FIG. 7 is a diagram showing an example of DR management information;

FIG. 10 is a diagram illustrating another example of volume management information;

FIG. 11 is a diagram illustrating another example of backup volume management information;

FIG. 14 is a diagram illustrating another example of volume management information;

FIG. 15 is a diagram illustrating another example of backup volume management information; and FIG. 16 is a flowchart for explaining another example of the failback process.

DESCRIPTION OF THE PREFERRED EMBODIMENTS

Figure 1:
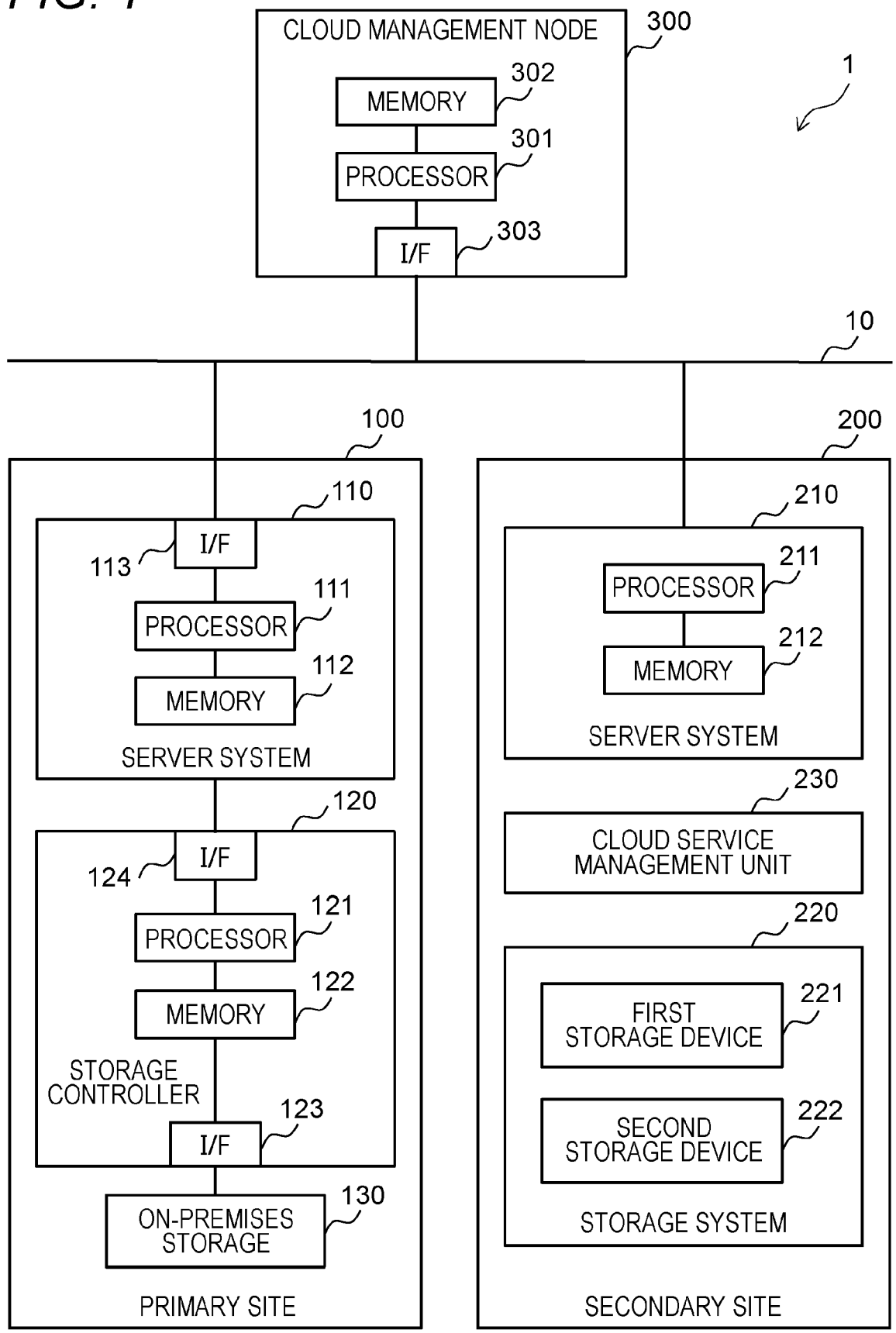
FIG. 1 is a block diagram illustrating a hardware configuration example of an information processing system according to an embodiment of the present disclosure.

Hereinafter, embodiments of the present disclosure will be described with reference to the drawings.

However, the following embodiments are examples for describing the present invention, and omission and simplification are appropriately made for clarity of description. In addition, not all combinations of features described in the embodiments are essential to the solution of the invention. The present invention is not limited to the embodiments, and all application examples consistent with the idea of the present invention are included in the technical scope of the present invention. Those skilled in the art can make various additions, modifications, and the like to the present invention within the scope of the present invention. The present invention can be carried out in various other forms. Unless otherwise specified, each component may be singular or plural.

Note that, in the following description, the information about the present invention will be described by an expression "table", but these pieces of information do not necessarily have to be expressed by a data structure based on a table, but may be expressed by a data structure such as "list" or "DB (database)" or other structures. Therefore, the "table", the "list", the "DB", and the like can be simply referred to as "information" to indicate that they do not depend on the data structure. Further, in describing the content of each piece of information, expressions such as "identification information", "identifier", "name", "name", and "ID" can be used, and these can be replaced with each other.

In addition, in the following description, processing performed by executing a program may be described. The program is executed by at least one processor (for example, a CPU) to perform predetermined processing using a storage resource (for example, a memory) and/or an interface device (for example, a communication port) as appropriate. Therefore, the subject of the processing may be a processor. Similarly, the subject of the processing performed by executing the program may be a controller, a device, a system, a calculator, a node, a storage system, a storage device, a server, a management calculator, a client, or a host having a processor. A subject (for example, a processor) of the processing performed by executing a program may include a hardware circuit that performs part or all of the processing, or may be modularized. For example, the subject of the processing performed by executing the program may include a hardware circuit that performs encryption and decryption or compression and decompression. Various kinds of programs may be installed in each calculator by a program distribution server or a storage medium. The processor operates as a function unit that realizes a predetermined function by operating according to the program. An apparatus and a system including a processor are an apparatus and a system each including the function unit. In addition, the "read/write process" may be referred to as a "read/write process", an "update process", or the like.

In each drawing, the same reference numerals are given to the common configurations. When the same kind of elements are described without being distinguished in each drawing, common numbers in reference marks or reference marks are used, and when the same kind of elements are distinguished and described, the reference marks of the elements are used or IDs allocated to the elements are used instead of the reference marks.

(1) Configuration

FIG. 1 is a block diagram illustrating a hardware configuration example of an information processing system according to an embodiment of the present disclosure. An information processing system 1 illustrated in FIG. 1 is a backup system that provides a function of backing up data stored in an on-premises storage 130, which is an on-premises storage device, to a storage system 220 provided by a cloud service.

In the present embodiment, the information processing system 1 is also a disaster recovery system that provides a disaster recovery configuration. As illustrated in FIG. 1, the information processing system 1 includes a primary site 100, a secondary site 200, and a cloud management node 300, which are connected to each other via a network 10 (for example, an Internet Protocol (IP) network). In the present embodiment, the primary site 100 is an on-premises first storage system (on-premises storage system), and the secondary site 200 is a cloud service second storage system (cloud storage system). However, at least the secondary site 200 is required to be a cloud storage system, and the primary site 100 may be a cloud storage system. Hereinafter, for convenience of description, "disaster recovery" may be referred to as disaster recovery (DR).

The primary site 100 is an on-premises storage system that provides a service by an application program (hereinafter, may be abbreviated as an application or an app) to a user (customer) in a normal state, and includes a server system 110, a storage controller 120, and the on-premises storage 130.

The server system 110 includes a processor 111, a memory 112, and a network interface (I/F) 113, and is connected to the network 10 via the I/F 113. The storage controller 120 includes a memory 122, a front-end network interface (I/F) 124, a back-end storage interface (I/F) 123, and a processor 121 connected thereto. The storage controller 120 is connected to the server system 110 via the I/F 124 and is connected to the on-premises storage 130 via the I/F 123. The on-premises storage 130 is a storage device that physically stores data. In the server system 110 and the storage controller 120, the memory and the processor may be made redundant.

The memory 122 stores various kinds of information and programs (computer programs). There are one or more programs. The processor 121 reads and executes the program stored in the memory 122 to provide a storage area (here, a volume (logical volume)) to the server system 110 and perform processing according to an input/output (I/O) request such as a write request and a read request from the server system 110. For example, the server system 110 receives an I/O request designating a volume from a host (not illustrated) which is a host device used by the user to transmit the I/O request to the storage controller 120. Then, the processor 121 of the storage controller 120 reads and writes data from and to the volume in the on-premises storage 130 in response to the I/O request.

The storage controller 120 and the on-premises storage 130 may be configured as one storage system. Examples of such a type of storage system include a high-end storage system based on a redundant array of independent (or inexpensive) disks (RAID) technology or a storage system using a flash memory.

The on-premises storage 130 may include, for example, a node group (for example, a distributed system) having a multi-node configuration including a plurality of storage nodes each having a memory device. Each storage node may be a general-purpose physical calculator. Each physical calculator may execute predetermined software to construct software-defined anything (SDx). Examples of the SDx can include software defined storage (SDS) or software-defined datacenter (SDDC). Further, the on-premises storage 130 may be a hyper-converged infrastructure-based storage system. For example, the on-premises storage 130 may be a system having a function (for example, an execution body (for example, a virtual machine or a container) of an application that issues an I/O request) as a host system that issues an I/O request and a function (for example, an execution body (for example, a virtual machine or a container) of the storage software) as a storage system that processes the I/O request. Note that the configuration of the on-premises storage 130 is merely an example, and is not limited thereto.

The secondary site 200 is a DR site that holds data of the primary site 100 in preparation for a data loss in the primary site 100 when a large-scale disaster such as an earthquake or a fire occurs, and recovers data and services of the primary site 100 using the held data when a failure or the like occurs in the primary site 100. In the present embodiment, the secondary site 200 is a cloud storage system that belongs to a public cloud and serves as a base of a cloud storage service provided by a cloud vendor. Examples of the cloud storage service include Amazon web services (AWS) (registered trademark), Azure (registered trademark), and Google Cloud Platform (registered trademark). The cloud storage system used in the secondary site 200 may be a storage system belonging to another type of cloud (for example, a private cloud) instead of the public cloud.

The secondary site 200 includes a server system 210 and the storage system 220, and is connected to the network 10.

The server system 210 includes a processor 211, a memory 212, and a network interface (not illustrated), and is connected to the network 10 via the network interface. In addition, the server system 210 may further include a storage device.

The storage system 220 includes a plurality of types of storage devices having different performances and capacities. In the present embodiment, the storage system 220 includes a first storage device 221 of a high cost for a high end and a second storage device 222 of a large capacity at a low cost. The first storage device 221 and the second storage device 222 include a portion similar to that of the storage controller 120 and a portion for physically storing data. As a specific example of the storage system 220, the first storage device 221 corresponds to block storage provided by a storage service called "EBS" in AWS, and the second storage device 222 corresponds to object storage provided by a storage service called "S3" in AWS.

A cloud service management function 230 is a component having a function of managing overall cloud services related to the cloud. In general, the cloud service is configured such that the cloud service management function 230 receives a request by a user, selects an appropriate resource according to the request by the user from a plurality of resources having different specifications prepared in advance, and constructs an environment requested by the user using the resource. This general method is used for the secondary site 200 of the present embodiment.

Main resources in the cloud service are the server system 210 and the storage system 220. The cloud service management function 230 may be, for example, an appliance (dedicated device) or a general-purpose physical calculator. In addition, the cloud service management function 230 may be part of the server system 210 or may be in the cloud management node 300. Hereinafter, the cloud service management function 230 is realized by a program stored in the memory 212 in the server system 210 in the cloud service. However, in FIG. 1, for clarity, the cloud service management function 230 is shown in the secondary site 200 as a separate configuration from the memory 212 of the server system 210.

The cloud management node 300 is an appliance that performs control for backing up data stored in the on-premises storage 130 to the storage system 220, performs control for constructing a DR configuration of the primary site 100 and the secondary site 200, and mediates data transfer between the primary site 100 and the secondary site 200. The cloud management node 300 may be provided as part of the cloud service of the secondary site 200, or may be provided by the cloud service management function 230. In the present embodiment, the cloud management node 300 is a physical calculator having a memory 302, an I/F 303, and a processor 301 connected thereto.

Note that the data transfer scheme between the on-premises storage 130 at the primary site 100 and the storage system 220 at the secondary site 200 is a scheme in which data is directly transferred via the network 10 in the example of FIG. 1. However, the data transfer scheme is not limited to this scheme, but may be a scheme of transferring data using another network path or line for data transfer. Furthermore, the type of network or line is not particularly limited.

In addition, a storage management system may be connected to the network 10. The storage management system is, for example, a calculator system (one or more calculators) that manages a configuration of a storage area of the on-premises storage 130, and can instruct a setting related to the on-premises storage 130 from a user.

Figure 2:
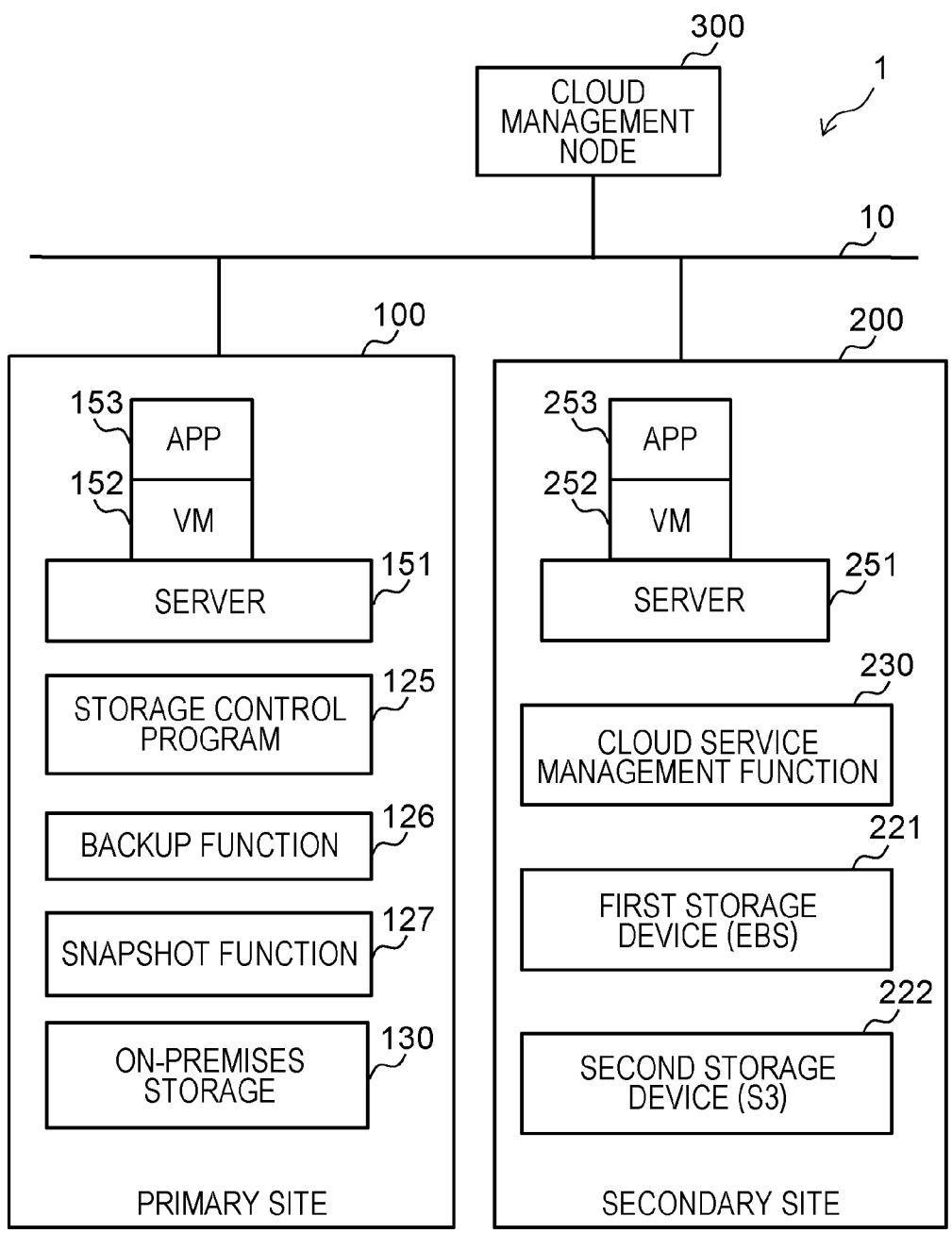
FIG. 2 is a diagram illustrating an operational image of an information processing system 1.

FIG. 2 is a diagram illustrating an operational image of the information processing system 1.

As illustrated in FIG. 2, in the primary site 100, one or more VMs 152 are generated on a server (server group) 151 including one or more server systems 110. The VM 152 is a virtual machine, and an app 153 designated by the user is executed on each VM 152. The app 153 is an application that provides a service to the user, and is determined according to a service designated by the user.

In the primary site 100, data is stored in a storage area in the on-premises storage 130 via a pool by, for example, a capacity virtualization technology. A storage control program 125 is a program stored in the memory 122 of the storage controller 120 and controls the on-premises storage 130. A backup function 126 and a snapshot function 127 are functions (or programs thereof) implemented by programs stored in the memory 122 of the storage controller 120. The backup function 126 has a function of transferring data stored in the on-premises storage 130 of the primary site 100 to the cloud storage serving as the secondary site 200. The snapshot function 127 has a function of acquiring data in the on-premises storage 130, for example, a snapshot of a volume.

VM control information (not illustrated) is stored in the memory 112 of the server system 110. The VM control information may be stored in the on-premises storage 130. The VM control information includes information for controlling the VM 152, for example, information indicating the amount of resource (for example, a volume) allocated to each VM 152.

The app 153 executed on the VM 152 is instructed by the user. The memory (that is, a memory 117 of the server system 110) of the server system 151 stores correspondence information of an identifier indicating a correspondence between the VM and the app 153 to be executed by both identifiers. Alternatively, the identifier correspondence information may be stored in a storage management system (not illustrated) (a calculator system that manages a configuration of a storage area of the on-premises storage 130) connected via the network 10.

In the information processing system 1, the cloud management node 300 acquires the resource configuration information and the app information of the primary site 100 and instructs the cloud service side, so that the secondary site 200 can construct a DR environment in which the VM (VM 252) and application (app 253) same as those of the primary site 100 are executed. The resource configuration information and the app information of the primary site 100 are stored in, for example, the memory 112 of the server system 110 or the on-premises storage 130, but may be stored in a storage management system (not illustrated) connected via the network 10.

With the above configuration, it is possible to store the backup of the data of the on-premises storage 130 in the second storage device 222 in the secondary site 200 and restore the volume in the on-premises storage 130 to the storage device in the cloud-side storage system 220 using the backed up data. Then, the information processing system 1 having a DR configuration can be implemented by the primary site 100 including the on-premises storage 130 and the secondary site 200 including the cloud-side storage system 220.

Figure 3:
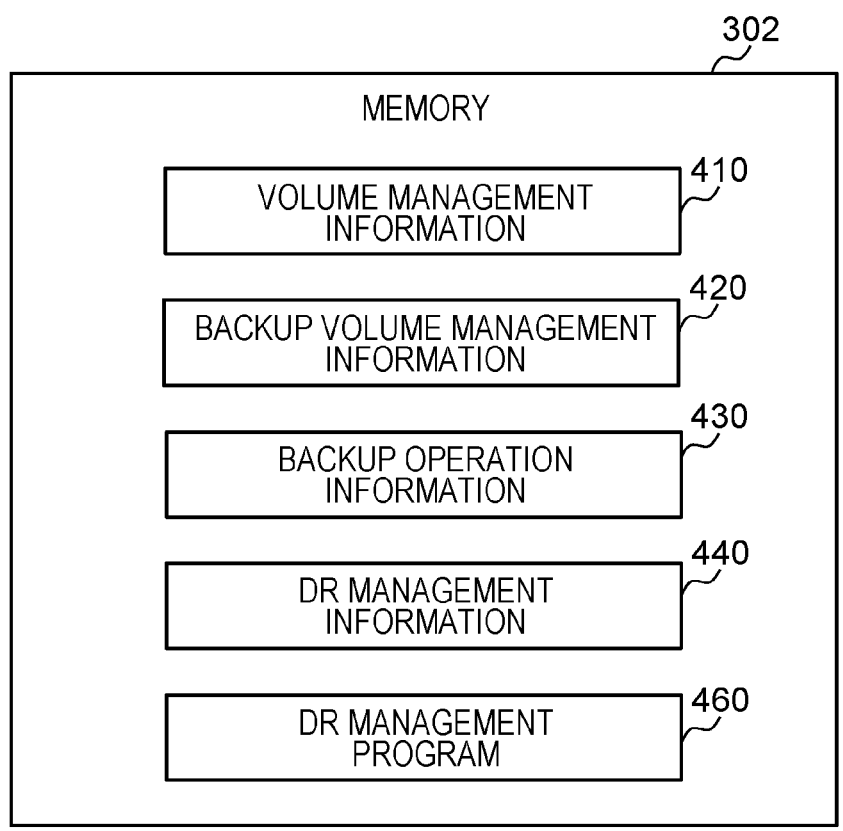
FIG. 3 is a diagram illustrating control information and a control program.

FIG. 3 is a diagram illustrating control information and a control program stored in the memory 302. As illustrated in FIG. 3, the memory 302 of the cloud management node 300 stores, as control information, volume management information 410, backup volume management information 420, backup operation information 430, and DR management information 440. Specific examples of the control information are illustrated in FIGS. 4 to 7. Memory 302 also stores a DR management program 460 as a control program. The memory 302 may store a program for implementing various functions (not shown) in addition to the DR management program 460.

The DR management program 460 issues a DR environment construction instruction between the primary site 100 and the secondary site 200, forms a primary and a secondary related in the DR environment of the VM and the app, controls data transfer from the primary site 100 to the secondary site 200, and restores a volume from backup data in the secondary site 200.

FIG. 4 is a diagram illustrating an example of the volume management information 410. The volume management information 410 is information for managing respective volumes of the on-premises storage 130 and the storage system 220, and FIG. 4 illustrates an example of managing a volume of the on-premises storage 130. The volume management information 410 includes a snapshot volume ID 412, a snapshot acquisition date and time 413, and a group ID 414 for each volume ID 411.

The volume ID 411 is an identifier of the volume. The snapshot volume ID 412 is an identifier of a snapshot volume which is a snapshot of a volume. The snapshot acquisition date and time 413 indicates an acquisition date and time when the snapshot volume is acquired. The group ID 414 is an identifier of a backup group serving as a backup unit of the volume.

In the example of FIG. 4, the value of the volume ID 411 is set to "1 (#1)", "2 (#2)", . . . , the value of the snapshot volume ID 412 is set to S1", "S2", . . . , and the value of the group ID 414 is set to "BuG1", "BuG2", . . . .

Among the snapshot volumes in the on-premises storage 130, the snapshot volume whose acquisition date and time is older than a predetermined reference may be deleted when backed up to the storage system 220.

FIG. 5 is a diagram illustrating an example of the backup volume management information 420. The backup volume management information 420 includes information for managing data to be backed up in the storage system 220. The backup volume management information 420 includes, for each volume ID 421, a device ID 422, a backup volume ID 423, a difference ID 424, address information 425, and a device ID 426.

The volume ID 421 is an identifier of a volume of the on-premises storage 130 to be backed up. The device ID 422 is an identifier of a storage device (on-premises storage 130) in which the volume of the volume ID 421 is stored. The backup volume ID 423 is an identifier of a volume (snapshot volume) backed up in the cloud storage (storage system 220). The difference ID 424 is an identifier of the difference data. The difference data is data updated after the snapshot volume of the previous time (one generation ago) is acquired. The address information 425 is information indicating a storage area in which the difference data of the difference ID 424 is stored. The device ID 426 is an identifier of a storage device (second storage device 222) that stores the volume indicated by the backup volume ID 423 and the difference data indicated by the difference ID 424. The device ID 422 and the device ID 426 are, for example, serial numbers (S/N). In the present embodiment, the device ID of the on-premises storage 130 is referred to as a "storage AA", the device ID of the first storage device 221 is referred to as a "storage BB", and the device ID of the second storage device 222 is referred to as a "storage CC".

FIG. 6 is a diagram illustrating an example of the backup operation information 430. The backup operation information 430 includes a backup operation condition 432 for each group ID 431. The group ID 431 is an identifier of a backup group. The backup operation condition 432 indicates the content of the backup operation of the volume belonging to the backup group of the group ID 431. The content of the backup operation indicates a timing of performing backup and the like.

In the example of FIG. 6, for the volume belonging to the backup group in which the group ID 431 is "BuG1", the snapshot is acquired on an hourly basis from 8:00 to 23:00 of each day, and the backup is performed at the acquired timing. The backup operation information 430 is registered in advance. For example, the backup operation information 430 may be registered in response to a command or a user instruction from a user input graphical user interface (GUI), or may be automatically generated and registered by the cloud management node 300.

FIG. 7 is a diagram illustrating an example of DR management information 440. DR management information 440 includes information indicating a DR relationship which is a relationship between primary site 100 and secondary site 200. The DR management information 440 includes a primary volume ID 442, a secondary ID 443, and a secondary volume ID 444 for each primary ID 441.

The primary ID 441 is an identifier (device ID) of the on-premises storage 130 which is a storage system constituting the primary site 100. The primary volume ID 442 is an identifier of a volume of the primary site 100 as a DR target. The secondary ID 443 is an identifier (device ID) of the storage system 220 constituting the secondary site 200. The secondary volume ID 444 is an identifier of a volume at the secondary site 200.

(2) Processing

Hereinafter, a snapshot process, a backup process, and a DR configuration construction process (failover process and failback process) in the information processing system 1 according to the present embodiment will be described. In the following description, a volume having a volume ID 411 of "#X" is referred to as the volume #X, a snapshot volume having a snapshot volume ID 412 of "SX" is referred to as the snapshot volume SX, difference data having a difference ID of "dSX" is referred to as the difference data dSX, and the like. X is an integer of 0 or more.

(2-1) Snapshot Process

The volume stored in the on-premises storage 130 is backed up by a snapshot. Specifically, the user sets in advance the backup information indicating the timing (time, interval, or the like) of acquiring the snapshot as the operation plan of the backup, and the information processing system 1 backs up the volume of the on-premises storage 130 according to the set operation plan. At this time, a plurality of generations of snapshots is usually acquired for the volume in the on-premises storage 130.

For example, at the first acquisition timing (here, it is assumed to be 8:00), the snapshot function 127 acquires, as the snapshot volume S0, the snapshot of the volume #1, which is the first volume used for the normal transaction in the on-premises storage 130. The snapshot function 127 registers "S0" for the snapshot volume ID 412 corresponding to the volume ID 411 "#1" of the volume management information 410, and registers the acquisition date and time when the snapshot volume S0 is acquired for the snapshot acquisition date and time 413 corresponding to the volume ID 411 "#1". Note that the snapshot volume S0 has the contents same as those in the initial state (state at 8:00) of the volume #1.

Thereafter, when the data of the volume #1 is updated, the snapshot function 127 stores the updated position (address) in the volume and the updated data in a predetermined storage area. Here, the predetermined storage area is a storage area of the on-premises storage 130, but may be another area (for example, a storage area of the memory 122) in the primary site 100. Then, at the next acquisition timing (9:00), the snapshot function 127 acquires the snapshot of the volume #1 as the snapshot volume S1. In this case, the snapshot volume S1 has the contents of the volume #1 updated before 9:00. Thereafter, the snapshot function 127 acquires a snapshot of the volume #1 on an hourly basis. In the example of FIG. 4, snapshots are acquired until 13:00 on an hourly basis, and snapshot volumes S2 to S5 are generated. At this time, the snapshot function 127 registers the snapshot volume ID 412 and the snapshot acquisition date and time 413 of the volume management information 410.

A method of acquiring the snapshot is not particularly limited. Examples of a method of acquiring a snapshot include a method of pointing data of all addresses to data of the volume #1 at a timing of acquiring the snapshot volume S0, a method of pointing to an address of the volume #1, and a method of storing a position (address) in an updated volume and updated data in a predetermined storage area.

(2-2) Backup Process

Figure 8:
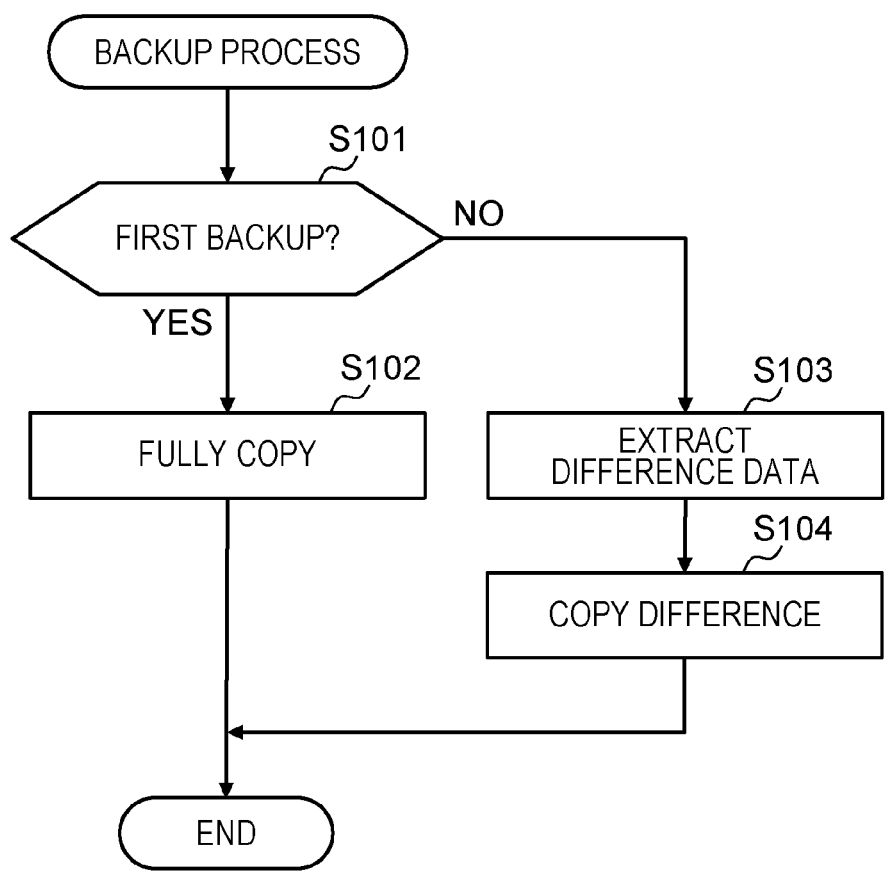
FIG. 8 is a flowchart for explaining an example of a backup process.

FIG. 8 is a flowchart for explaining an example of a backup process. Hereinafter, the volume to be backed up is referred to as a volume #1. In addition, in FIG. 8, a backup process will be described, as an example, in a case where a backup group whose group ID 431 of the backup operation information 430 is "BuG1" is backed up at a timing when a snapshot is acquired.

Note that, as the pre-processing for performing the backup process, the backup function 126 performs the following process. That is, the backup function 126 instructs the cloud management node 300 to generate a backup group. The cloud management node 300 registers the group ID 414 of the backup group including the volume #1 of the on-premises storage 130 in the volume management information 410 according to the instruction. Further, the cloud management node 300 registers the group ID 414 as the group ID 431 in the backup operation information 430. Further, the backup function 126 registers the contents of the backup operation of the volume belonging to the backup group in the backup operation condition 432 according to an instruction from the user. In addition, the backup function 126 registers the volume ID 421 corresponding to the volume #1, the device ID 422, of the on-premises storage 130, in which the volume #1 is stored, and the device ID 426, of the second storage device 222, that backs up the volume #1 in the backup volume management information 420.

The backup function 126 starts the backup process at the backup timing indicated by the backup operation condition 432. In the backup process, first, the backup function 126 refers to the volume management information 410 and determines whether the volume #1 which is the volume to be backed up is backed up for the first time (step S101).

In the case of the first backup (step S101: YES), the backup function 126 registers "S0" for the backup volume ID 423 of the backup volume management information 420. Then, the backup function 126 executes full copy in which all data of the snapshot volume (here, the snapshot volume S0) of the volume #1 is copied to the backup destination (step S102), and ends the process. The backup destination is indicated by the backup volume management information 420, and is the second storage device 222 of the storage system 220 in the present embodiment.

On the other hand, when it is not the first backup (step S101: NO), the backup function 126 extracts difference data dS1 updated from the timing (8:00) at which the snapshot volume (here, the snapshot volume S0) of one generation ago is acquired to the timing (9:00) at which the snapshot volume (here, the snapshot volume S1) of the current generation (latest) is acquired (step S103).

Note that, in the information processing system 1, one difference bitmap is provided for one snapshot volume in order to manage the difference data. The difference bitmap is information having a plurality of bits and associating data of a predetermined data size with each bit. In the present embodiment, in the initial state, all bits of the difference bitmap are "0". Furthermore, for example, in a case where data of 64 KB is associated with each bit of the difference bitmap, when at least 1B in the data of 64 KB is updated, the bit is "1". That is, the data at the bit "1" is data updated after the previous snapshot is acquired, and the data at the bit "0" is data not updated after the previous snapshot is acquired (that is, the data same as the data of the snapshot volume one generation ago). The difference data includes update address information which is address information of the snapshot volume S1 corresponding to a bit indicating "1" in the difference bitmap, and update data which is data of the bit.

When the difference data dS1 is extracted, the backup function 126 registers the identifier "dS1" of the difference data dS1 as the difference ID 424 in the backup volume management information 420. Then, the backup function 126 registers the address information of the storage area in which the difference data dS1 is stored as the address information 425 (step S104), and ends the process. By performing the backup process using such difference data, the amount of data to be transferred to the backup destination can be reduced, and the cost required for the backup process can be suppressed.

By executing the above process at each backup timing, the backup process for the snapshot volumes S2 to S5 is sequentially executed.

(2-3) Failover Process

In the information processing system 1, as described above, the DR configuration using the primary site 100 including the on-premises storage 130 and the secondary site 200 including the storage system 220 is constructed. When a failure is detected at the primary site 100, the DR management program 460 executes a DR process to execute a failover process to the secondary site 200.

In the failover process, a volume restoration process of restoring the volume in the primary site 100 to the secondary site 200 is performed using the backup data.

Figure 9:
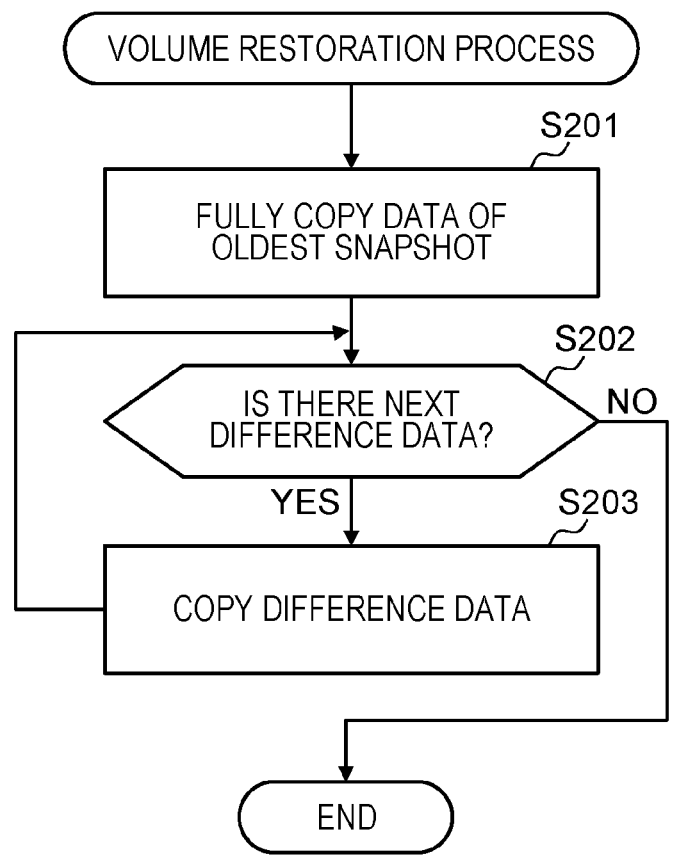
FIG. 9 is a flowchart for explaining an example of a volume restoration process.

FIG. 9 is a flowchart for explaining an example of the volume restoration process. Hereinafter, a process of restoring the volume #1 stored in the on-premises storage 130 to the volume #2 which is the second volume of the first storage device 221 at the secondary site 200 will be described as an example.

Note that, in the present embodiment, data stored in the on-premises storage 130 is backed up to the second storage device 222, and the second storage device 222 is an object storage. The storage device accessible by the VM 252 that performs the transaction process is a block storage or a file storage such as the first storage device 221, and cannot directly access and use the backup data stored in the second storage device 222 that is an object storage. Therefore, in the volume restoration process, a process of moving data from the second storage device 222 to the first storage device 221 is required.

In the volume restoration process, the DR management program 460 first refers to the backup volume management information 420 to identify the second storage device 222 that is the backup destination to store the backup of the volume #1 to be restored. The DR management program 460 refers to the volume management information 410 and the DR management information 440, and fully copies, as data of the volume #2, all data corresponding to the snapshot volume S0 whose snapshot acquisition date and time 413 is the oldest among the data backed up to the identified second storage device 222 to the first storage device 221 that is the DR destination of the volume #1 of the on-premises storage 130 (step S201).

Thereafter, the DR management program 460 refers to the difference ID 424 of the backup volume management information 420 to determine whether there is unapplied difference data which is difference data not copied to the first storage device 221 (step S202).

When there is unapplied difference data (step S202: YES), the DR management program 460 applies the oldest difference data among the unapplied difference data to the snapshot volume S0 of the first storage device 221 (step S203), and returns to the process of step S202. In step S203, for example, when the oldest difference data among the unapplied difference data is difference data dS1, the DR management program 460 refers to the address information 425 of the difference data dS1 and copies (overwrites with) the difference data dS1 to the volume #2. As a result, the volume #2 stores the same data as the snapshot volume S1.

Through the above processing, the volume #2 is overwritten with the difference data dS1 to dS5 in order from the oldest. As a result, the volume #2 stores the data same as the data at the timing when the snapshot volume S5 of the volume #1 of the on-premises storage 130 is acquired. That is, the snapshot volume S5 of the volume #1 is restored as the volume #2 in the first storage device 221. As a result, there is no unapplied difference data (step S202: NO), and the volume restoration process ends.

Upon completion of the volume restoration process, the DR management program 460 acquires the snapshot of the volume #2 as snapshot volume RS0. The acquisition of the snapshot volume RS0 is preferably performed at the same time as the end of the volume restoration process. As a result, the snapshot volume RS0 stores the same data as the snapshot volume S5 of the volume #2.

Then, the DR management program 460 updates volume management information 410a which is the volume management information 410 for managing the volume of the first storage device 221.

FIG. 10 is a diagram for describing an example of the volume management information 410a. The volume management information 410a as illustrated in FIG. 10 includes, for each volume ID 411a, a snapshot volume ID 412a, a snapshot acquisition date and time 413a, and a group ID 414a. Here, the volume ID 411a is an identifier of the volume #2 of the first storage device 221. The "BuG1" same as that of the group ID of the backup volume to which the volume #1 of the on-premises storage 130 belongs is registered in the group ID 414a.

Note that since the restoration of the volume #1 is performed in the state of the latest snapshot volume S5, data updated after the snapshot volume S5 is acquired is not backed up in the on-premises storage 130 and is thus discarded. In addition, data updated after the snapshot volume S5 is acquired may be acquired by transmitting an update request from the secondary site 200 to the primary site 100 after failover.

When the restoration of the volume #1 is completed, the transaction process is resumed using the data stored in the storage system 220 of the secondary site 200. That is, in the secondary site 200, a process in response to the I/O request, a process of acquiring a snapshot, and the like are executed.

In the above example, the DR management program 460 executes the volume restoration process, but the volume restoration process may be executed by another program. The location at which the program is executed may be the cloud management node 300, the cloud service management function 230, the first storage device, or the like.

(2-4) Backup Process after Failover

When the transaction process is resumed at the secondary site 200, the storage system 220 of the secondary site 200 updates the data of the volume #2 in response to the I/O request of the volume #2. In addition, the storage system 220 resumes the backup operation.

In the example of FIG. 10, the snapshot volumes RS1 and RS2 of the volume #2 are acquired. The acquisition timing of the first snapshot after the cloud service management function 230 acquires the snapshot volume RS0 (corresponding to the snapshot volume S5) of the volume #2 and restores the volume #1 is 15:00. Further, a snapshot is acquired on an hourly basis thereafter.

In order to perform the backup operation, the DR management program 460 also updates the backup volume management information 420. FIG. 11 is a diagram illustrating an example of backup volume management information 420a which is the updated backup volume management information 420. As in the backup volume management information 420, the backup volume management information 420a includes, for each volume ID 421a, a device ID 422a, a backup volume ID 423a, a difference ID 424a, address information 425a, and a device ID 426a. Here, the backup destination is the second storage device 222 as in before the failover.

In the present embodiment, as the backup process, a scheme is used in which the full copy is performed in which all data of the snapshot volume is fully copied for the first time, and the difference copy is performed in which difference data updated after the previous snapshot is acquired is copied for the second and subsequent times. However, since the first snapshot volume RS0 after the failover can be created based on the already backed up snapshot volume S0 and the difference data dS1 to dS5, it is not necessary to fully copy the data of the snapshot volume RS0. Note that the necessity of full copy can be determined from the volume having the same group ID 431.

Figure 12:
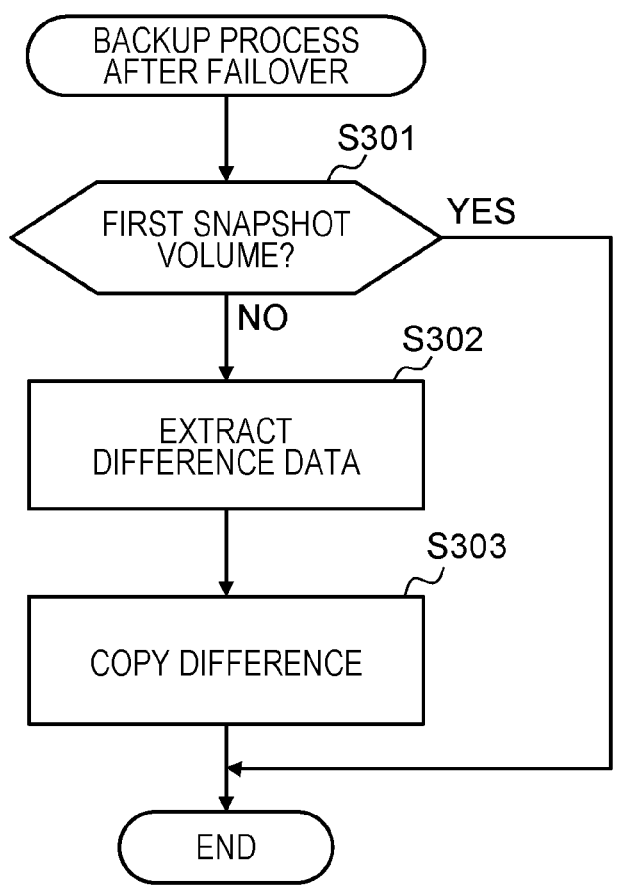
FIG. 12 is a flowchart for explaining an example of a backup process after failover.

FIG. 12 is a flowchart for explaining an example of a backup process after failover.

First, the cloud service management function 230 refers to the volume management information 410a and determines whether the volume #2 that is a volume to be backed up is the first snapshot volume RS0 (step S301).

When the volume #2 is the snapshot volume RS0 (step S301: YES), the cloud service management function 230 does not need to make a backup, and thus ends the process.

On the other hand, when the volume #2 is not the snapshot volume RS0 (step S301: NO), the cloud service management function 230 extracts difference data dRS1 updated from the timing of acquiring the snapshot volume (here, the snapshot volume RS0) one generation ago to the timing of acquiring the latest snapshot volume RS1 (step S302). A method of extracting the difference data is similar to that of step S103 in FIG. 8. That is, when the data of the volume is updated, the cloud service management function 230 changes the bit corresponding to the updated data in the difference bitmap from "0" to "1", and extracts the difference data by referring to the difference bitmap at the time of backup.

Then, the cloud service management function 230 transfers the difference data dRS1 to the second storage device 222 and stores it. The cloud service management function 230 registers the identifier "dRS1" of the difference data dRS1 as the difference ID 424a in the backup volume management information 420a. Then, the cloud service management function 230 registers the address information of the storage area in which the difference data dRS1 is stored as the address information 425a (step S303), and ends the process. The difference data dRS1 corresponds to a snapshot volume acquired after the snapshot volume S5.

The difference data updated after the previous snapshot for the snapshot volumes RS1 and RS2 is acquired is set as difference data dRS1 and dRS2. The difference data dRS1 and dRS2 are managed by, for example, a method similar to that of the difference data dS1.

In addition, the data of the volume #1 (volume #2) may be updated during the process of restoring the volume from the backup data in order to perform the failover. The update data of the volume #2 is included in the difference data as data updated after the previous snapshot is acquired. At this time point, the difference data dRS1 (and dRS2) may be managed as the difference data dS6 (and dS7).

(2-5) Failback Process

When the failure of the primary site 100 is recovered, a failback process of returning the execution subject of the transaction process to the primary site 100 is performed. In the failback process, a volume is restored in the on-premises storage 130 based on data backed up in the second storage device 222.

At this time, in a case where the data cannot be used such that it is not possible to guarantee that the data in the on-premises storage 130 is correct due to a failure of the primary site 100, there is a possibility that the data is destroyed, or the like, all the volumes are restored in the on-premises storage 130 using the data backed up in the second storage device 222. On the other hand, in a case where the failure of the primary site 100 is not related to the data in the on-premises storage 130, for example, in a case of a server failure or a path failure of the storage system, the restoration time of the volume may be shortened by restoring the volume using the data in the on-premises storage 130.

Figure 13:
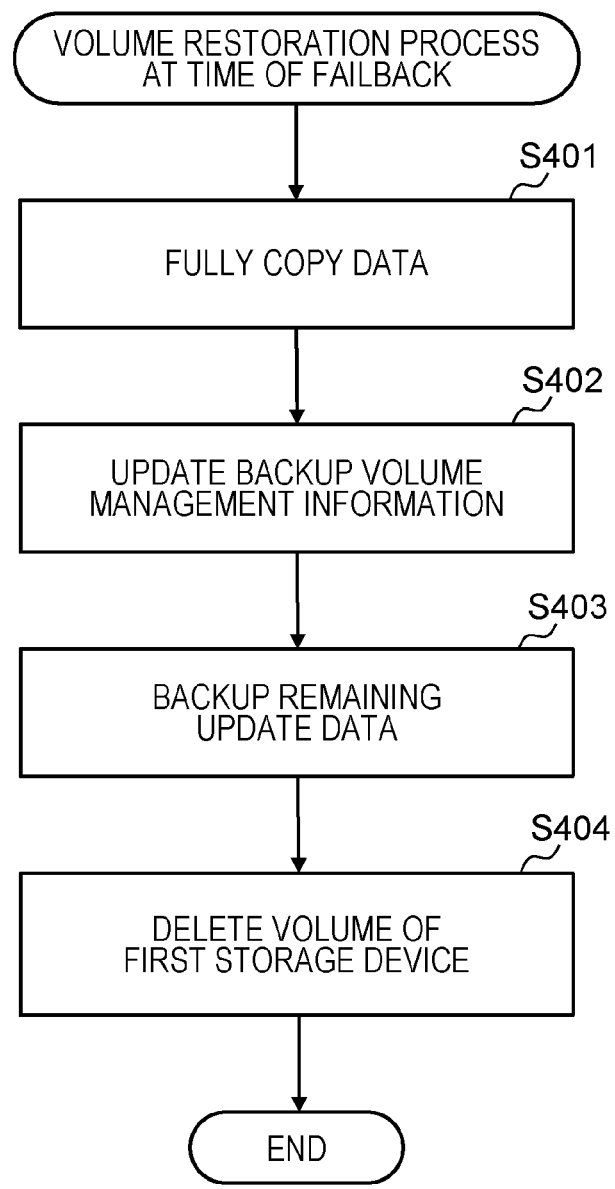
FIG. 13 is a flowchart for explaining an example of a failback process.

FIG. 13 is a flowchart for describing an example of a failback process in a case where all volumes are restored in the on-premises storage 130 using data backed up in the second storage device 222.

In the present failback process, the DR management program 460 first refers to the volume management information 410a and the backup volume management information 420a and fully copies the data of the volume #2 of the first storage device 221 to the volume #1 of the on-premises storage 130 (step S401). As a result, the volume #1 is in the latest state.

Subsequently, the DR management program 460 updates the volume management information 410 and the backup volume management information 420 so that the difference data dRS1 is managed as difference data dS6 corresponding to the snapshot volume S6 of the next generation of the snapshot volume of the last generation before failover and the difference data dRS2 is managed as difference data dS7 corresponding to the further next snapshot volume S7 (step S402).

At this time, data updated after the latest snapshot volume RS2 is acquired in the first storage device 221 is not backed up in the second storage device 222. Accordingly, the DR management program 460 backs up the updated data as difference data dS8 from the first storage device 221 to the second storage device 222 (step S403).

The DR management program 460 registers the identifier "dS8" of the difference data dS8 for the difference ID 424a of the backup volume management information 420a. Then, the DR management program 460 restores all the volumes of the first storage device 221 to the on-premises storage 130, and deletes all the volumes of the first storage device 221 (step S404). At this time, the DR management program 460 may delete the corresponding contents of the volume management information 410a. DR management program 460 may not delete the volume of first storage device 221.

FIG. 14 is a diagram illustrating an example of the updated volume management information 410, and FIG. 15 is a diagram illustrating an example of the updated backup volume management information 420.

FIG. 16 is a flowchart for explaining an example of a failback process using data remaining in the on-premises storage 130.

In the present failback process, the DR management program 460 identifies the last update date and time of the volume of the on-premises storage 130 (step S501). The DR management program 460 copies difference data acquired after the last update date and time from the first storage device 221 to the on-premises storage 130 and overwrites the volume of the on-premises storage 130 with the difference data (step S502).

Since the difference data is not backed up to the second storage device 222, the DR management program 460 backs up the difference data from the first storage device 221 to the second storage device 222 (step S503). This process is similar to that of step S403.

The DR management program 460 restores all the volumes of the first storage device 221 to the on-premises storage 130, deletes all the volumes of the first storage device 221 (step S504), and ends the process.

Note that the information processing system 1 can provide a volume of date and time requested by the user. For example, when up to the snapshot volume S5 is acquired in the on-premises storage 130 and the snapshot volume S1 is already deleted, the DR management program 460 can generate the snapshot volume S1 from the difference data of the snapshot volume backed up to the second storage device 222 and provide the snapshot volume S1 to the user. In addition, when the snapshot volume S6 of the volume #1 of the on-premises storage 130 is requested by the user during the failover, the DR management program 460 can refer to the backup volume management information 420a of FIG. 11, recognize that the snapshot volume RS1 corresponds to the snapshot volume S6, and provide the snapshot volume S6. When the snapshot volume RS1 is deleted from the first storage device 221 during the failover, the DR management program 460 can generate the snapshot volume RS1 (snapshot volume S6) using the difference data dRS1 and provide the snapshot volume RS1 to the user.

The present disclosure can also be applied to a remote copy configuration, volume migration, and the like in addition to the DR configuration.

In addition, in a case where the movement of the volume is frequently executed as in a case where the VM 152 of the information processing system 1 is a container, it is desirable to smoothly continue the setting of the backup operation instead of performing the setting of the backup operation every time.

As described above, according to the present embodiment, the storage controller 120 of the primary site 100 includes the volume #1 that stores data, and copies the first backup data, which is backup data of data corresponding to the volume #1, to the storage system 220. In the failover process of handing over the execution of the transaction process from the primary site 100 to the secondary site 200, the cloud management node 300 restores the volume #1 as the volume #2 to the storage system 220 based on the first backup data copied to the storage system 220. The cloud management node 300 manages the first backup data, as second backup data, that is backup data of data corresponding to the volume #2. Therefore, it is not necessary to create new backup data acquired by fully copying the data corresponding to the volume #2, and thus, it is possible to reduce the cost related to the backup.

In the present embodiment, the storage system 220 includes the first storage device 221 and the second storage device 222 having lower performance than the first storage device 221. The storage controller 120 copies the first backup data to the second storage device 222. In the failover process, the cloud management node 300 copies the first backup data copied to the second storage device 222 to the first storage device as data corresponding to the second volume.

In the present embodiment, the storage system 220 updates the data corresponding to the volume #2 in response to the I/O request of the volume, and copies the #2 data corresponding to the volume to the second storage device 222 as the second backup data. In the failback process of returning the execution of the transaction process from the secondary site 200 to the primary site 100, the cloud management node 300 copies the data stored in the first storage device 221 to the on-premises storage 130 as data corresponding to the volume #1. In addition, the cloud management node 300 manages the second backup data copied to the second storage device 222 as backup data of data corresponding to the volume #1. Therefore, the cost related to the backup after the failback process can be reduced.

In addition, in the present embodiment, the cloud management node 300 fully copies data corresponding to the volume #2 to the on-premises storage 130. In this case, it is possible to copy data to the on-premises storage 130 appropriately at the time of the failback process.

In addition, in the present embodiment, the cloud management node 300 copies data corresponding to the volume #2 updated after the date and time when the volume #1 is last updated to the on-premises storage 130 so that the data corresponding to the volume #1 is overwritten. In this case, the transfer amount of data in the failback process can be reduced, and the failback process can be performed in a short time.

The above-described embodiments of the present disclosure are examples for describing the present disclosure, and are not intended to limit the scope of the present disclosure only to these embodiments. Those skilled in the art can practice the present disclosure in various other aspects without departing from the scope of the present disclosure.

What is claimed is:

1. An information processing system comprising:
a first storage system;
a second storage system; and
a management node,
wherein
the first storage system includes a first volume for storing data and copies first backup data to the second storage system, the first backup data being backup data of data corresponding to the first volume, and
in a failover process of handing over execution of a transaction process from the first storage system to the second storage system,
the management node
restores the first volume, as a second volume, to the second storage system based on the first backup data copied to the second storage system, and
manages the first backup data as second backup data that is backup data of data corresponding to the second volume, wherein
the second storage system includes a first storage device and a second storage device having lower performance than the first storage device,
the first storage system copies the first backup data to the second storage device,
and
in the failover process, when restoring the first volume, the management node copies, as data corresponding to the second volume, the first backup data copied to the second storage device to the first storage device,
wherein
the second storage system
updates data corresponding to the second volume in response to an I/O request of the second volume, and
copies, as second backup data, data corresponding to the second volume to the second storage device, and
wherein the first backup data comprises a full copy of the data corresponding to the first volume stored at a first time and the second backup data comprises differential data of the data corresponding to the first volume stored at a second time.

2. The information processing system according to claim 1, wherein
in a failback process of returning execution of the transaction process from the second storage system to the first storage system,
the management node
copies, as data corresponding to the first volume, data stored in the first storage device to the first storage system, and
manages, as first backup data, second backup data copied to the second storage device, the first backup data being backup data of data corresponding to the first volume.

3. The information processing system according to claim 2, wherein
in the failback process,
the management node fully copies, as data corresponding to the first volume, data corresponding to the second volume to the first storage system.

4. The information processing system according to claim 2, wherein
in the failback process,
the management node copies data corresponding to the second volume, the data being updated after a date and time when the first volume is last updated, to the first storage system so that data corresponding to the first volume is overwritten.

5. A backup method by an information processing system including a first storage system, a second storage system, and a management node, wherein
the first storage system includes a first volume for storing data and copies first backup data to the second storage system, the first backup data being backup data of data corresponding to the first volume, and
in a failover process of handing over execution of a transaction process from the first storage system to the second storage system, when restoring the first volume, the management node
restores the first volume, as a second volume, to the second storage system based on the first backup data copied to the second storage system, and
manages the first backup data as second backup data that is backup data of data corresponding to the second volume, wherein
the second storage system includes a first storage device and a second storage device having lower performance than the first storage device,
the first storage system copies the first backup data to the second storage device,
and
in the failover process, the management node copies, as data corresponding to the second volume, the first backup data copied to the second storage device to the first storage device,
wherein
the second storage system
updates data corresponding to the second volume in response to an I/O request of the second volume, and
copies, as second backup data, data corresponding to the second volume to the second storage device, and wherein
the first backup data comprises a full copy of the data corresponding to the first volume stored at a first time and the second backup data comprises differential data of the data corresponding to the first volume stored at a second time.

* * * * *